United States Patent
Betts

[11] 3,802,770
[45] Apr. 9, 1974

[54] ANALYSIS PROJECTOR
[75] Inventor: Howard B. Betts, Mineola, N.Y.
[73] Assignee: Vanguard Instrument Corporation, Mellville, L.I., N.Y.
[22] Filed: July 11, 1973
[21] Appl. No.: 378,177

[52] U.S. Cl. .............................................. 352/169
[51] Int. Cl. ........................................... G03b 21/38
[58] Field of Search................... 352/166, 169, 137

[56] References Cited
UNITED STATES PATENTS
1,165,513   12/1915   Kamm............................. 352/166

Primary Examiner—Monroe H. Hayes
Attorney, Agent, or Firm—Ostrolenk, Faber, Gerb & Soffen

[57] ABSTRACT

A flickerless analysis projector is constructed so that its light shutter is driven through a slip clutch during still projection. During normal and low speed projection the light shutter is driven through different synchronous clutches to synchronize film stripping with shutter position. Engagement of the synchronous clutches is facilitated by having the clutch parts rotate at small differential speeds during the engaging period, with the slip clutch being caused to slip during periods when the synchronous clutches are engaged. A selectively operable accelerating mechanism is provided to speed up film movement during low speed projection.

7 Claims, 2 Drawing Figures

PATENTED APR 9 1974

3,802,770

ANALYSIS PROJECTOR

This invention relates to motion picture projectors in general and more particularly to an analysis projector that produces flickerless projection at a relatively low frame rate and produces a projection of substantially the same intensity for all modes of operation. In order to analyze information recorded on motion picture film, it is often necessary to project at low frame rates, say approximately one-fifth of the frame rate required for normal motion picture presentation. If a conventional motion picture projector is operated at such low speed, there is unsatisfactory picture presentation resulting from objectionable image flicker. This condition is caused by the construction of conventional projectors in which the intermittent film advance mechanism and light shutter mechanism both slow down at low frame rates. The long "in transit" time for feeding each frame into the projection aperture coupled with the long duration of the shutter closed time at low frame rates produces blanking at a frequency that is much too low to be tolerated by the eye of the observer.

Devices for so-called flickerless projection are known, but they are constructed for operation over a wide speed range, and are relatively complex and expensive. An example of a prior art flickerless projector is found in my U. S. Pat. No. 3,586,223, issued June 22, 1971, for a Flickerless Projector. In accordance with the instant invention, an analysis projector is provided with a limited choice of projection speeds which will be economical to construct and useful where low speed flickerless viewing of motion picture film is required.

As will hereinafter be seen a projector constructed in accordance with the instant invention will have at least one low speed flickerless projection mode providing the same picture brightness as is found in the normal speed projection mode. In addition, there is the ability to advance a single frame on demand, without flicker, and with the same picture brightness as at normal projection speed. Projection of a still frame is at the same brightness as for normal projection speed, and the film may be advanced in both a forward and reverse direction.

Accordingly, a primary object of the instant invention is to provide a novel construction for an analysis projector that provides a flickerless presentation at low frame rates.

Another object is to provide an analysis projector of this type that is economical to manufacture.

Still another object is to provide an analysis projector of this type in which presentation brightness for still viewing and low speed viewing is at essentially the same brightness as for normal motion picture speeds.

A further object is to provide an analysis projector of this type having novel drive accelerator means that is selectively operable to increase the speed of film advanced for each frame during low speed projection.

These objects as well as other objects of this invention will become readily apparent after reading the following description of the accompanying drawings in which.

Figure 1:
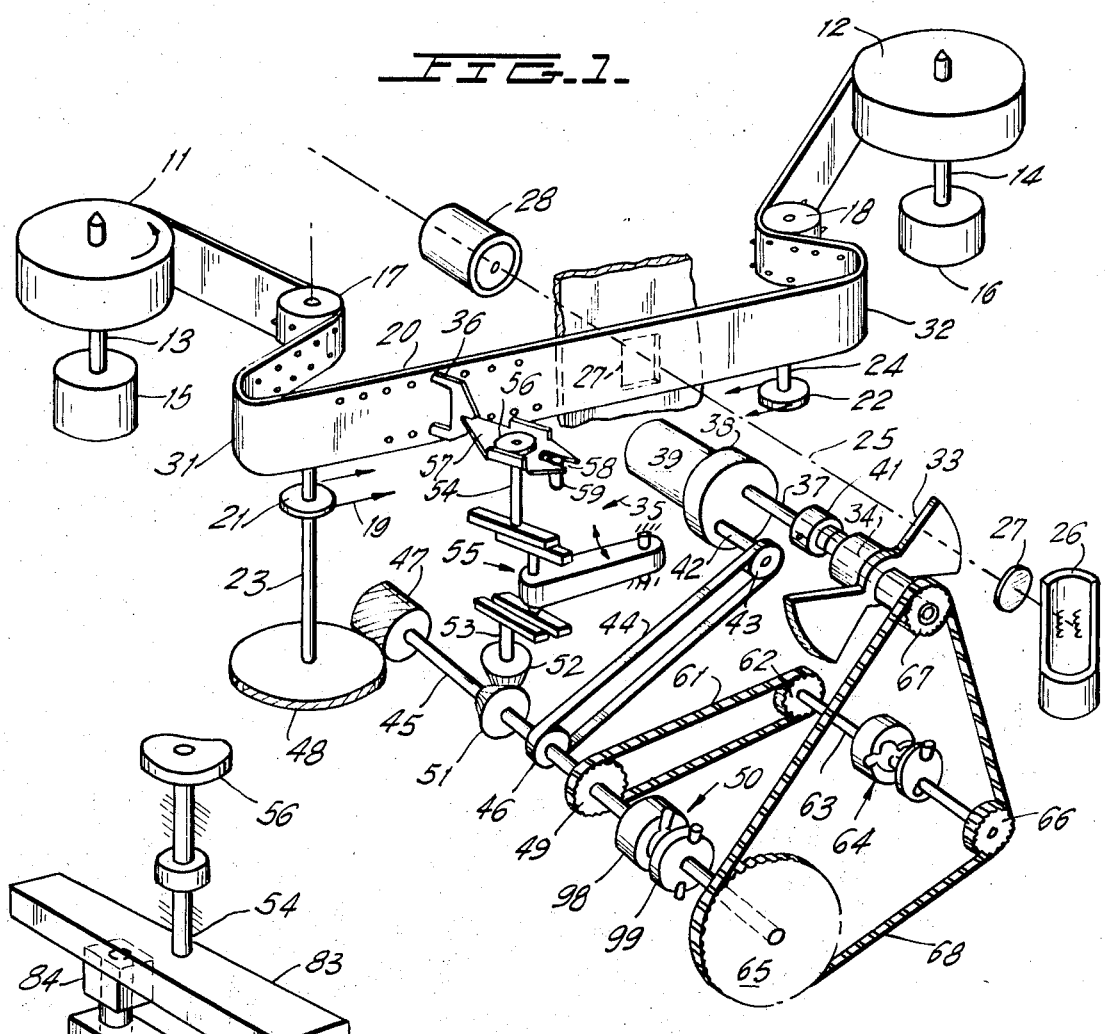
FIG. 1 is a perspective in schematic form illustrating an analysis projector constructed in accordance with teachings of the instant invention.

Now referring to the figures. The analysis projector of FIG. 1 is provided with film supply reels 11, 12 mounted on the respective shafts 13, 14 driven by torque motors 15, 16, respectively. Filmstrip 20 extends between reels 11 and 12 and is guided over metering sprockets 17, 18 which are driven together by chain 19 mating with sprockets 21, 22 thereby maintaining film loops at locations 31 and 32 to facilitate intermittent feeding of film 20. Sprockets 21, 22 are keyed to the respective shafts 23, 24 having sprockets 17, 18, respectively, keyed thereto.

Lamp 26 generates a light beam along a projection path indicated by line 25. Projection path 25 extends through condenser lens 27, film 20, projection aperture 27, and projection lens system 28 to a screen (not shown). The two blades of light shutter 33 mounted to shaft 34 move across projection path 25 to intermittently intercept light generated by lamp 26 and prevent such light from reaching projection aperture 27 especially when claw 36 of intermittent film drive means 35 is moving film 20.

Shaft 34 is connected by slip clutch 41 to one output shaft 37 of transmission 38 that is driven by reversible motor 39. The other output shaft 42 of transmission 38 mounts sprocket 43 that drives timing chain 44 which in turn drives sprocket 46 keyed to main shaft 45. Main shaft 45 drives worm 47 engaged with worm wheel 48 keyed to film sprocket shaft 23. In addition, main shaft 45 drives sprocket 49, synchronous clutch 50, and bevel gear 51. The latter is in driving engagement with bevel gear 52 keyed to input shaft 53 of the drive accelerator mechanism 55 illustrated in detail in FIG. 2. Output shaft 54 of mechanism 55 has film advance cam 56 keyed thereto. In a manner known to the art, cam 56 is in driving engagement with upturned portions of cam plate 57. Pawl 36 is secured to one end of plate 57, and the other end of plate 57 is provided with elongated slot 58 which receives stationary pin 59 about which plate 57 is pivoted to reciprocate pawl 36. Another cam (not shown) drives plate 57 so that pawl 36 disengages film 20 except during the driving stroke of pawl 36.

Sprocket 49 drives timing chain 61 which in turn drives sprocket 62 keyed to auxiliary shaft 63 having synchronous clutch 64 mounted thereon. When synchronous clutch 50 is actuated, sprocket 65 is driven by main shaft 45, and when synchronous clutch 64 is actuated, sprocket 66 is driven by auxiliary shaft 63. Timing chain 68 is in driving engagement with sprockets 65, 66, 67, with the latter being keyed to light shutter shaft 34.

Figure 2:
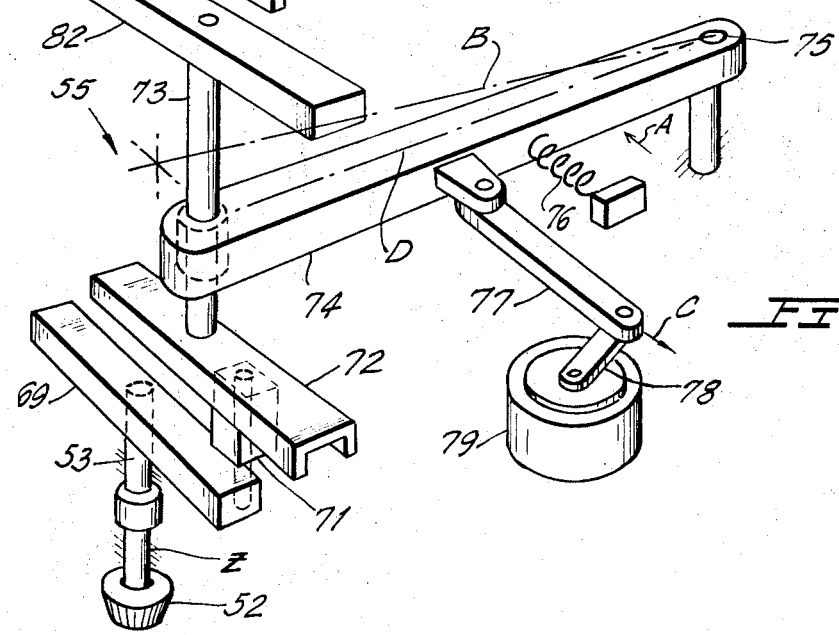
FIG. 2 is an enlarged perspective of the drive accelerator mechanism.

With particular reference to FIG. 2, it is seen that drive accelerator mechanism 55 includes drive arm 69 keyed to input shaft 53 and having slide block 71 pivotally mounted at one end thereof. The latter is positioned between the downwardly facing arms of driven member 72 keyed to intermediate shaft 73. The latter is rotatably supported at one end of shift arm 74, whose other end is mounted to fixed pivot 75. Spring 76 biases shift arm 74 in the direction indicated by arrow A, toward a normal position indicated by centerline B wherein intermediate shaft 73 and input shaft 53 are in axial alignment. Link 77 connects a midpoint of shift arm 74 to one end of crank arm 78 whose other end is mounted to rotary solenoid 79. When the latter is actuated, arm 77 pivots in the direction indicated by arrow C, thereby pivoting shift arm 74 to its accelerate position indicated by centerline D, wherein shafts 53 and 73 are misaligned.

When shift arm 74 is in its normal position with shafts 53 and 73 aligned, driving and driven members 69, 72 rotate in unison throughout each portion of each revolution. However, when shafts 53, 73 are misaligned, there is a portion of each revolution of drive member 69 during which the angular speed of driven member 72 on intermediate shaft 73 exceeds the angular speed of member 69, and it is during this period of acceleration that film advance pawl 36 steps film 20. The acceleration combination including members 69, 72 interconnected by slide block 71 is duplicated by drive member 82 keyed to intermediate shaft 73, driven member 83 keyed to output shaft 54, and slide block 84 pivotally mounted to one end of member 82 and positioned between the downturned edge sections of arm 83. Input and output shafts 53, 54 are axial aligned so that with intermediate shaft 73 in its normal position the latter is aligned with both shafts 53 and 54. The angular positions of members 72 and 82 on intermediate shaft 73 are set so that the angular accelerations achieved by both sections of drive accelerator mechanism 55 occur simultaneously thereby producing a multiplied acceleration effect in the driving of cam 56.

It is noted that output shaft 37 of transmission 38 rotates at a constant relatively high speed and output shaft 42 is selectively rotated either at a relatively high speed or relatively low speed, or is unclutched completely. In a manner well known to the art, operation of output shaft 42 is controlled by electric clutches (not shown) of transmission 38.

Operation of the analysis projector occurs selectively in four modes. These modes are: (1) projection of a still frame; (2) single frame advance; (3) low speed projection; and (4) normal or high speed projection. For purposes of the following explanation, normal or high speed projection is at the rate of 24 frames per second or 1,440 frames per minute, and low speed projection is at the rate of four frames per second or 240 frames per minute.

For projection of a still frame, motor 39 rotates shaft 37 at 1,460 rpm, and shaft 42 is unclutched so that film advance mechanism 35 does not feed film 20. Synchronous clutches 50 and 64 are deenergized or open, so that rotation of light shutter 33 comes about directly through coupling by clutch 41 to shaft 37. Illumination of the projected image will be at a level closely the same as in the three other modes of operation, to be described below, because shutter 33 is rotating at 1,460 rpm which, as will hereinafter be seen, closely approximates the speed of shutter 33 during the motion picture type projection modes.

For single frame film advance, synchronous clutches 50 and 64 are deenergized, the clutches of transmission 38 are actuated to rotate output shaft 42 at 240 rpm and accelerator mechanism 55 is actuated so that shift arm 74 thereof is offset to line D. Timing belt 44 and sprockets 43, 46 interconnect shafts 42, 45 to rotate at the same speed. A switch (not shown) counts a single revolution of shaft 45, and after a revolution is sensed this switch causes output 42 to be declutched so that only a single frame of film 20 is advanced.

Since intermediate shaft 73 of accelerator mechanism 55 is offset from input and output shafts 53, 54, very rapid film feeding is accomplished and film motion is not detected by the observer's eye. Shutter 33 continues to rotate so that illumination remains constant. In this mode of operation, no attempt is made to synchronize shutter 33 with movement of film 20, since advance of only a single frame does not cause the viewer's eye to detect any pattern of objectionable or degrading viewing effects in the projected image.

For the low speed projection mode, shift arm 74 is moved to center line D, the clutches of transmission 38 are operated so that output shaft 42 rotates at 240 rpm, synchronous clutch 64 is deenergized, and synchronous clutch 50 is energized. Immediately prior to engagement of clutch 50, sprocket 65 is driven by sprocket 67 at a ratio of 1:6, so that part 99 of clutch 50 keyed to the shaft portion having sprocket 65 thereon rotates at approximately 260 rpm since sprocket 67 is being driven by output shaft 37 through slip clutch 41. At this time the other part 98 of clutch 50 is rotating at 240 rpm, so that there is a low differential speed (20 rpm) between relatively moving parts 98, 99 of clutch 50. This low differential speed permits the rollers on clutch part 99 to locate and fall into grooves of clutch part 98. When this occurs, slip clutch 41 is overridden and slips at a relatively low speed relative to output shaft 37, with the latter continuing to rotate at 1,460 rpm, while shutter 33 rotates at 1,440 rpm.

It is noted that the angular orientation of synchronous clutch 50 is such that with parts 98, 99 thereof engaged, shutter 33 is timed with intermittent film advance mechanism 35 to properly synchronize film movement with light blocking by shutter 33. Since accelerator solenoid 75 is actuated, movement of film 20 during each step thereof is very rapid, being at the same speed as film movement at the normal frame rate of 24 frames per second. This results in flickerless operation for low speed projection, and there is no observable change in illumination from that obtained during still projection and single frame advance.

For operation in the high speed mode, solenoid 79 of accelerator mechanism 55 is deenergized, so that intermediate shaft 73 returns to its normal position aligned with input and output shafts 53, 54. Clutch 50 is deenergized, clutch 64 is energized, and output shaft 42 rotates at 1,440 rpm. Under these conditions timing belt 61 and sprockets 49, 62 connect main and intermediate shafts 45, 63 to operate at the same speed. Since clutch 64 is engaged, sprocket 66 operates timing belt 68 to control rotation of shutter 33. In this mode of operation, the same 20 rpm differential in speed exists between transmission shaft 37 and shutter shaft 34 so that there is slipping at clutch 41. The provision of timing belts 61 and 68 maintains shutter 33 synchronized to film advance mechanism 35. Projection is at a relatively high frame rate, shutter 33 is synchronized with film advance, and projected illumination is the same as for the low speed projection mode.

While this invention has been described only in connection with an analysis projector having only a single low speed operating mode, additional speeds for low speed operation may be obtained by merely adding pulleys and clutches.

Although there have been described preferred embodiments of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows:

1. A film projector including a light source generating a beam along a projection path; film supply means; film drive means for intermittently moving film from said supply means across said projection path; light shutter means at said light path to intermittently interrupt light projection therealong; diving means including first and second outputs; said second output being selectively settable at a first speed and a second speed greater than said first speed; first drive means including a slip clutch for transmitting motion from said first output to said shutter means; second drive means for transmitting motion from said second output to said film drive means; third drive means including a first selectively engageable shutter synchronizing clutch for transmitting motion of said second output to said shutter means; fourth drive means including a second selectively engageable shutter synchronizing clutch for transmitting motion of said second output to said shutter means; with said second output set at said first speed, said first synchronizing clutch engaged and said second synchronizing clutch disengaged, said second drive means driving said film drive means at a relatively slow speed and said third drive means driving said shutter means synchronized with said film drive means at a low speed differential with respect to the speed of said first output thereby causing said slip clutch to slip; with said second output set at said second speed, said second drive means driving said film drive means at a relatively fast speed and said first synchronizing clutch deactuated, and said second synchronizing clutch actuated, said fourth drive means driving said shutter means synchronized with said film drive means at a speed slightly in excess of the speed of said first output thereby causing said slip clutch to slip.

2. A film projector as set forth in claim 1 in which the second drive means includes a selectively actuable drive acceleration mechanism operable when said second output is at said first speed to accelerate operation of said film drive means during motion thereof which moves film across said projection path with film motion occurring while said shutter means blocks light transmission along said projection path.

3. A film projector as set forth in claim 1 in which there is a main shaft, an auxiliary shaft, and a shutter means shaft; a first timing connection between said main and auxiliary shafts and a second timing connection between said shutter means shaft and said main and auxiliary shafts; said first synchronizing clutch being interposed between portions of said main shaft having sections of said first and second timing connections; said second synchronizing clutch being interposed between portions of said auxiliary shaft having other sections of said first and second timing connections; said second timing connection providing a speed multiplication from said main shaft to said shutter means shaft.

4. A film projector as set forth in claim 3 in which the second drive means includes a selectively actuable drive acceleration mechanism operable when said second output is at said first speed to accelerate operation of said film drive means during motion thereof which moves film across said projection path with film motion occurring while said shutter means blocks light transmission along said projection path.

5. A film projector as set forth in claim 3 in which the first timing connection provides a 1:1 ratio between said main and auxiliary shafts.

6. A film projector as set forth in claim 5 in which the second drive means includes a selectively actuable drive acceleration mechanism operable when said second output is at said first speed to accelerate operation of said film drive means during motion thereof which moves film across said projection path with film motion occurring while said shutter means blocks light transmission along said projection path; said drive acceleration mechanism being interposed between said main shaft and said film drive means.

7. A film projector as set forth in claim 3 in which the drive acceleration mechanism includes a drive member on a drive shaft, a driven member on a driven shaft, a connecting means joining said members, actuation of said mechanism being effective to change the lateral positions of the drive and driven shafts relative to each other, with said mechanism actuated said connecting means being at a fixed distance from said drive shaft and being spaced from said driven shaft by a distance that varies within each revolution of said drive shaft.

* * * * *